C. McINTOSH.
TROUGHS FOR STOCK-CARS.
No. 173,033.    Patented Feb. 1, 1876.
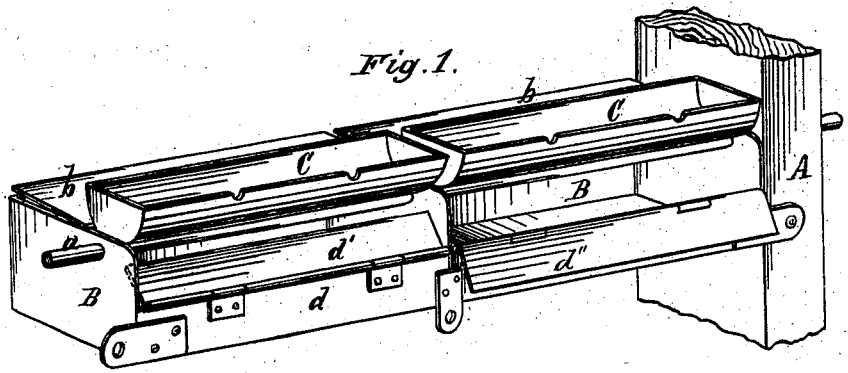
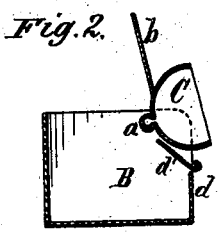
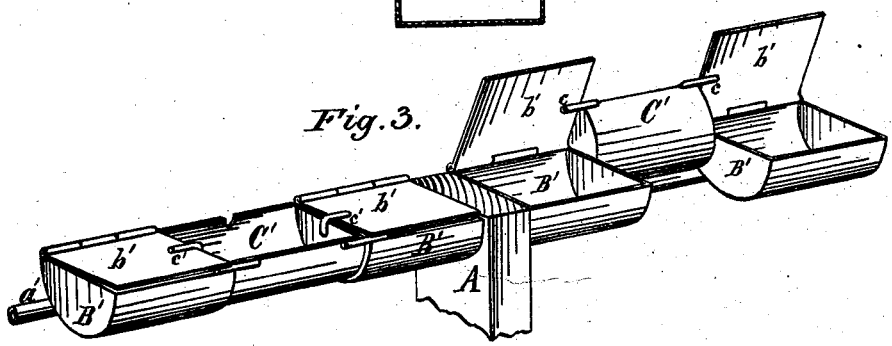
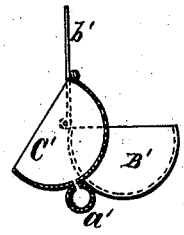
Witnesses:
Alex. Mahon
John E. Center
Inventor:
Charles McIntosh
by A. M. Smith
Attorney

UNITED STATES PATENT OFFICE.

CHARLES McINTOSH, OF JERSEY CITY, NEW JERSEY.

IMPROVEMENT IN TROUGHS FOR STOCK-CARS.

Specification forming part of Letters Patent No. 173,033, dated February 1, 1876; application filed January 17, 1876.

*To all whom it may concern:*

Be it known that I, CHARLES MCINTOSH, of Jersey City, county of Hudson, State of New Jersey, have invented a new and useful Improvement in Feed and Water Troughs for Stock-Cars, &c., of which the following is a full, clear, and exact description, reference being had to the accompanying drawing, making a part of this specification, in which—

Figure 1 represents a perspective view of two of the feed and water troughs or compartments. Fig. 2 is a transverse vertical section through the same. Fig. 3 represents a modification in the arrangement of the feed and water troughs, and Fig. 4 shows the latter in transverse vertical section.

My invention relates to a novel construction and arrangement of the feed and water troughs, more particularly adapted for stock-cars, for facilitating the feeding and watering of the stock; and consists, first, in combining the water-troughs and their supply-pipe with the feed-troughs and the covers to the latter, in such manner that when the water-troughs are in position for watering the stock the feed-troughs will be closed, and when the water-troughs are turned up for emptying them, or getting them out of the way, the feed-troughs will be opened and in position for feeding the stock, as hereinafter described. It further consists in a novel construction of the feed boxes or troughs, adapting them to be readily filled from the side of the car, as hereinafter described.

It has not been thought necessary to show the construction of the car in the accompanying drawings, to which reference is made in the following description, for the reason that my improvements may be readily applied to any usual or preferred construction of stock-car, it being desirable, however, for economizing space, that the feed and water troughs shall extend longitudinally between the side studs or upright frame-timbers A of the car, one feed-trough, B, and one water-trough, C, such as is shown in Fig. 1, each extending from one stud or upright to another, or two short troughs, B' B', and an intermediate water-trough, C', as shown in Fig. 3, filling said space.

The feed-boxes B may be made in any suitable or preferred form, either rectangular or nearly so, as shown in Figs. 1 and 2, or they may be made in the trough form shown in Figs. 3 and 4, and, by preference, are rigidly secured to the frame-timbers of the car, intermediate between the side uprights or studs A. At or near the tops of these feed-troughs, and near their outer sides, is arranged a water-supply pipe, *a*, mounted in suitable bearings formed in or attached to the stud A, and extending from end to end of the car, for supplying all the water-troughs of the same series, or upon the same side of the car, and in the same plane or level.

These pipes are connected at one end by swiveling couplings with the down pipes, by which they are supplied from the water-tank, and the supply of water thereto may be regulated by any of the usual contrivances for that purpose. The water-troughs C are rigidly connected at their bottoms with the upper side of the pipe *a*, and said bottoms and pipe being perforated for the purpose, the water is admitted to the trough C in any desired quantity, and the stock having been supplied, both the troughs and pipes are emptied by partially rotating the pipe, thereby turning the troughs into position shown in Fig. 2. The boxes or troughs B are provided with lids or covers *b*, which are connected with the troughs C or pipe *a*, and, by the partial rotation of the latter for emptying them, the lids *b* are raised or turned into a vertical or nearly vertical position, as shown in Fig. 2, thereby giving the stock access to the feed-boxes B. The outer walls or sides of the feed-boxes are divided longitudinally, the upper part *d'* being hinged to the lower part *d*, which is rigid.

By this construction the part *d'* is adapted to be turned inward under the water-trough, as shown in Fig. 2, to allow the full dumping movement essential to the emptying of the water troughs and pipes, thereby obviating the necessity of raising the latter too high above the feed-troughs. When the troughs C are in proper position for watering the stock, and the feed-troughs are closed by the lids *b*, the hinged flaps *d'* may be turned outward, as shown at *d''*, to permit the feed-boxes to be filled by an attendant passing along the outside of the car, thereby obviating the necessity of either having the attendant pass through the car for that purpose, or for employing the usual supply-reservoirs, valves, and conductor-spouts, though, of course, the latter arrangement can also be used, if desired.

In the modification shown in Figs. 3 and 4, the feed and water troughs B′ C′ are shown arranged in the same plane, and these may be arranged either alternately, or two short sections or troughs may be employed, arranged adjacent to the studs A, with the troughs C′ intermediate between them. The troughs B′ are rigidly connected with the studs A or other car-frame timbers, and the pipes $a'$ in this construction extend along the outer sides of the troughs, being rigidly connected with the water-troughs C′, and perforated as before, for supplying water thereto. The troughs C′ are provided with lugs or ears $c\ c'$, which engage with the ends of the lids or covers $b'$ of the feed-boxes, and as the water-troughs are raised by the rotation of the water-pipe, for emptying said pipes and troughs, the lugs $c$ raise the lids $b'$, giving the stock access to the feed, the lugs $c'$ serving to reverse the movement of the lids, and to close the boxes B′ when the movement of the troughs C′ is reversed.

From the foregoing description it will be seen that, at convenient points in the transportation of stock, the feed-troughs may be closed and charged or filled with the water-troughs in position for receiving the supply of water. At the proper time water is let into the troughs C or C′ until the stock is supplied, when the water-troughs and the supply-pipes connected therewith are emptied, their movement in being thus emptied or dumped opening the feed-boxes to the stock, as described.

By the construction and arrangement shown all danger of the freezing of the water-pipes is obviated, as, after the water is let on and the stock supplied, the troughs are dumped, and the water continues to flow through the pipes and troughs until the supply is cut off, when they empty themselves.

After the stock has done feeding, the water-troughs and covers may be replaced, covering the feed-boxes, for protecting and keeping clean the contents of said boxes.

For larger stock, of course but a single row of feed and water troughs will be required on each side of the car; but for smaller stock, such as sheep and hogs, two sets of such troughs will be provided, one for the upper and one for the lower compartments on each side.

The arrangement of the watering-troughs is such that when dumped their contents will be thrown outside and clear of the car.

The valves or flaps $d$, for permitting the introduction of the feed to the boxes B, as described, may be modified in form and arrangement, so long as the objects recited are attained.

Having now described my invention, what I claim as new, and desire to secure by Letters Patent, is—

1. The stationary feed-troughs, provided with covers, in combination with the independent dumping water-troughs, substantially as described, whereby the tilting of the water-troughs for discharging their contents is made to open the feed-boxes, as set forth.

2. The combination of the feed-boxes B, feed-troughs C, and rocking water-supply pipe $a$, arranged and operating substantially as described.

3. The stationary feed-boxes B, provided with the lids or covers $b$ and valves $d'$, arranged substantially as and for the purpose described.

4. The combination, with the feed-boxes B, of the dumping water-troughs C and their supply-pipes $a$, lids or covers $b$, and side valves $d'$, all arranged and operating as described.

In testimony whereof I have hereunto set my hand this 14th day of January, A. D. 1876.

CHAS. McINTOSH.

Witnesses:
ALEXANDER MAHON,
JOHN G. CENTER.